Aug. 26, 1941.  F. H. VAN NEST  2,253,963
GOVERNING MECHANISM
Filed May 7, 1938  2 Sheets-Sheet 1

Inventor:
Francis H. Van Nest
by Harry E. Dunham
His Attorney.

Patented Aug. 26, 1941

2,253,963

UNITED STATES PATENT OFFICE 2,253,963

GOVERNING MECHANISM

Francis H. Van Nest, Saugus, Mass., assignor to General Electric Company, a corporation of New York Application May 7, 1938, Serial No. 206,617

9 Claims. (Cl. 121—41)

The present invention relates to governing mechanisms as may be used for controlling elastic fluid turbines or like prime movers in response to changes of an operating condition, for instance in response to changes in speed of a machine or pressure in an extraction stage or exhaust stage of a turbine. More specifically, the invention relates to governing mechanisms with variable regulation. Ordinary governing mechanisms usually have positive regulation, that is, in case of a pressure governor they permit for example a gradual drop in pressure as the load increases from no load to full load, while in case of a speed governing mechanism they permit a gradual drop in speed of a prime mover as the load on the prime mover increases from no load to full load. There are cases where it is desired to maintain pressure or speed constant, irrespective of variations in load. This is accomplished by the provision of a governing mechanism with zero regulation. There are other cases where a fixed negative regulation is desired which in the case of a pressure governing mechanism means that the pressure should rise as the load increases.

The general object of my invention is to provide an improved governing mechanism with variable regulation whereby such mechanism can be readily adjusted to obtain any degree of positive and negative regulation or zero regulation.

For a consideration of what I believe to be novel and my invention, attention is directed to the following description and the claims appended thereto in connection with the accompanying drawings.

Figure 1:
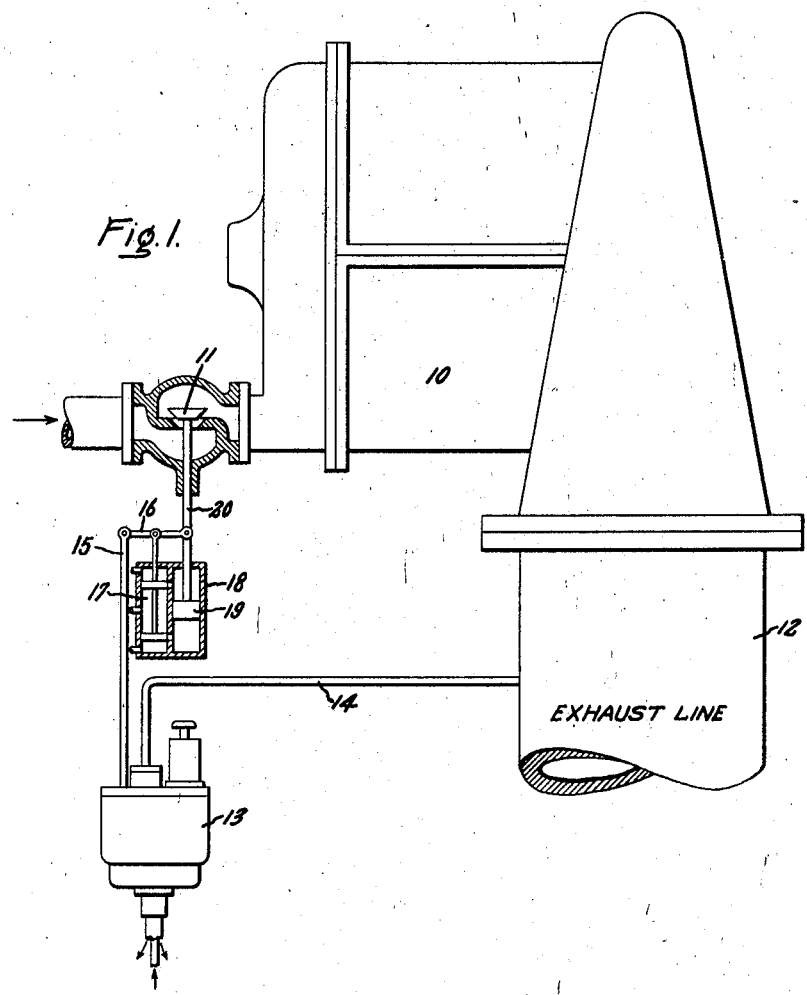
Figure 2:
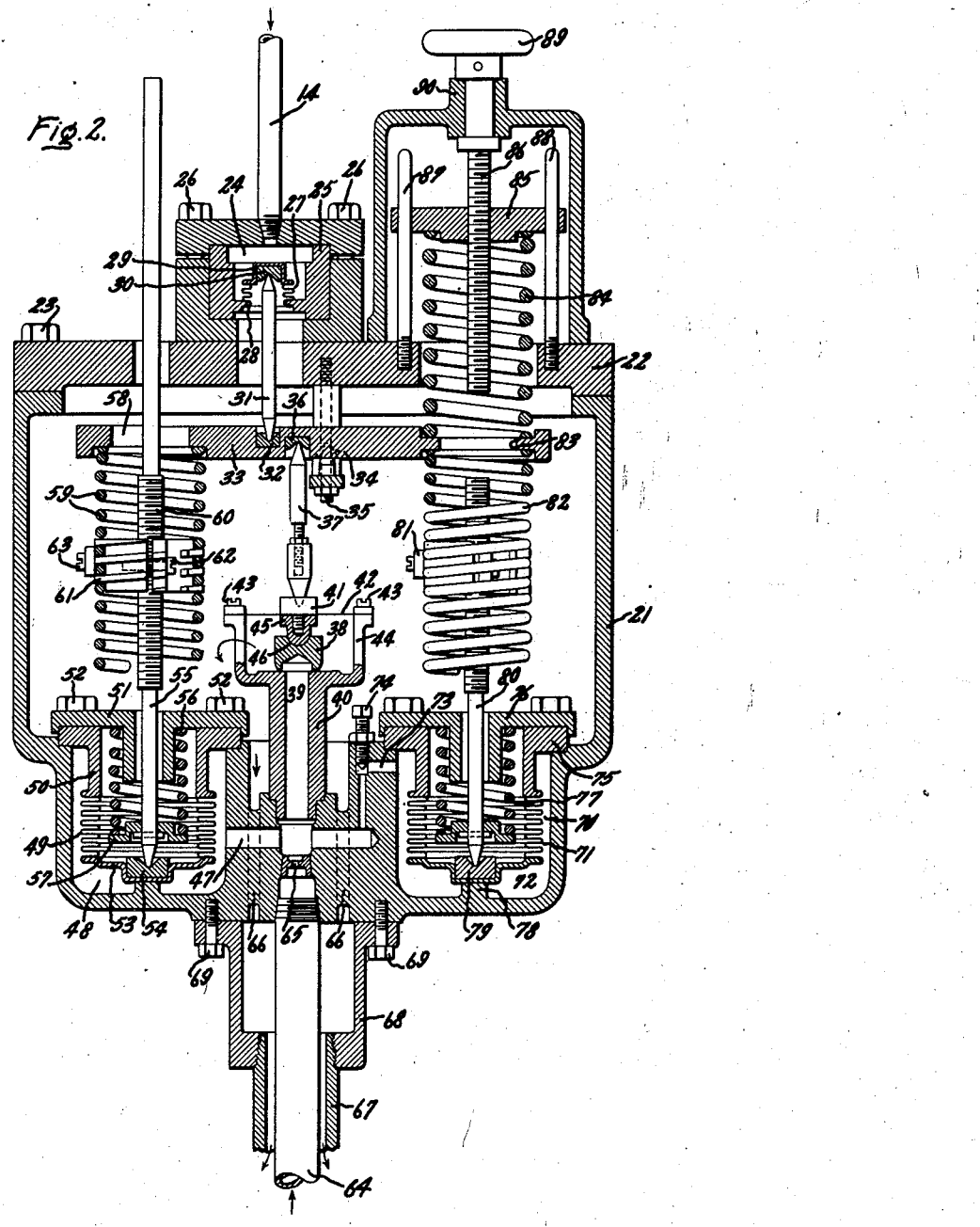

In the drawings Fig. 1 illustrates a diagrammatic view of a governing mechanism arrangement embodying my invention; and Fig. 2 shows a sectional detail view of the governing mechanism.

The arrangement of Fig. 1 comprises an elastic fluid turbine 10 which has an inlet valve 11 for controlling the flow of elastic fluid to the turbine and an exhaust conduit 12. The turbine is non-condensing, the elastic fluid discharged through the exhaust conduit being used for heating or other industrial purposes. In such cases it is desirable to maintain a certain pressure in the exhaust conduit during varying load conditions. To this end I provide a governing mechanism 13 which is subject to the pressure in the exhaust conduit 12 through a pipe 14. The mechanism has a controlled element 15 connected to the left-hand end of a floating lever 16. An intermediate point of the floating lever 16 is connected to a pilot valve 17 for controlling the flow of operating fluid to a hydraulic motor 18. The latter has a piston 19 with a stem 20 connected to the valve 11 and to the right-hand end of the floating lever 16. During operation an increase in pressure in the exhaust conduit 12 causes through the governing mechanism 13 upward movement of the controlled element 15 whereby the pilot valve 17 is moved upward and permits the flow of operating fluid to the upper side of the piston 19, thus forcing the piston 19 downward and resulting in closing movement of the valve 11 and drop in pressure in the exhaust conduit 12. Downward movement of the hydraulic motor piston with its stem 20 causes through the follow-up lever 16 downward movement of the pilot valve 17, thus restoring the latter to its neutral position. A drop in pressure in the exhaust conduit 12 causes similar operation except that the various elements move in opposite direction to open the turbine inlet valve 11.

Let us assume the pressure in the exhaust conduit 12 is 50 lbs. per square inch at no load. The governing mechanism 13 may be adjusted so that the pressure of 50 lbs. is maintained as the load increases from no load to full load or the governing mechanism may be adjusted so that the pressure of 50 lbs. changes gradually as the load on the turbine or the flow through the exhaust 12 increases from no load to full load.

The governing mechanism comprises a casing 21 with a cover 22 secured to the casing by bolts 23. The pipe 14 is connected to a device responsive to changes in a condition to be controlled. In the present instance the pipe 14 is connected to a pressure responsive device 24 which has a casing 25 secured to the cover 22 by means including bolts 26. The pressure responsive device has bellows 27 with a lower end secured to a flange 28 of the casing and an upper end closed by a plate 29 forming a seat for a conical pivot bearing 30. The pivot bearing 30 is connected by a link 31 having pivoted ends to a conical pivot bearing 32 of a governor lever 33. The lever 33 is fulcrumed on a conical pivot bearing 34 which in turn is secured to the cover 22 by bolts 35. The lower side of the lever forms a conical pivot bearing 36 which is connected by an adjustable link 37 to a variable orifice or a cup valve 38 in cooperative relation with the discharge end of a channel 39 formed by a tube 40. The connection between the cup valve 38 and the lower end of the link 37 includes a conical pivot bearing 41 on the upper side of a flexible diaphragm or leaf spring 42, which latter is secured by screws 43 to brackets 44 formed at the upper end of the tube 40. The pivot bearing 41 is screwed into a member 45 engaging the lower side of the diaphragm 42 and provided with a spherically-shaped extension engaging a spherical recess 46 in the cup valve 38. The channel 39 communicates through a channel 47 with a hydraulic motor 48. The latter has a bellows 49 connected at its upper end to a flanged cylinder 50 supported on the casing and secured thereto by means including a cover 51 and bolts 52. The lower end of the bellows 49 has a bottom plate 53 with a conical pivot bearing 54 engaged by the conically-shaped end of a link 55 or rod which forms a part of the controlled element 15. The link 55 is biased downward by a loading spring 56 which has an upper end bearing against the cover 51 and a lower end bearing against a plate 57 secured to the link. The loading spring forces the bottom plate 53 downward towards a seat, or, from another viewpoint, prevents collapsing of the bellows due to external pressure acting thereon. The upper end of the link 55 projects through an opening 58 in the left-hand portion of the lever 33. The link 55 is connected to the lever 33 by a spring 59 which has an upper turn bearing against the lower side of the lever 33. An intermediate turn of the spring 59 is fastened to a screw-threaded portion 60 of the link 55 by means of a screw clamp 61. The clamp 61 has a portion fastened to the screw-threaded link portion 60 by means including a screw 62 and an outer portion fastened to an intermediate turn of the spring 59 by a means including a screw 63. By loosening of the screws 62 and 63 the spring clamp may be turned up or down whereby the number of effective turns of the spring 59 between the screw clamp and the lever 33 may be varied. The regulating spring 59 is made comparatively strong in order to insure stability by large instantaneous regulation.

The arrangement includes means for supplying fluid under pressure such as oil to the hydraulic motor 48, the pressure of the fluid being varied by positioning of the variable orifice cup valve 38. Fluid is supplied to the channel 39 from a source of fluid under pressure, not shown, through a pipe 64 screwed into the lower end of the casing 21. An orifice or restriction 65 is provided near the discharge end of the tube 64. During normal operation, with the mechanism balanced, the cup valve 38 is in a fixed opening position. The fluid passing through the opening formed between the cup valve and its seat is discharged through channels 66 formed in the bottom of the casing and communicating with a discharge conduit 67 which surrounds the supply conduit 64. The upper end portion of the discharge or drain conduit 67 is screw-threaded into a flanged cup 68, which latter is fastened to the bottom of the casing by bolts 69.

The arrangement so far described permits ordinary regulation of fluid pressure in the exhaust conduit of the turbine in Fig. 1. The various elements described remain in a fixed position as long as the pressure in the turbine exhaust conduit is constant. Now if the pressure in the turbine exhaust conduit increases, due for instance to decrease in demand for exhaust steam, this increase in pressure is transmitted through the pipe 14 to the pressure responsive device 24 and causes collapsing of the bellows 27. This effects downward movement of the link 31 and counter-clockwise movement of the lever 33 about its fulcrum 34 whereby the link 37 forces the cup valve downward towards closing position. This closing movement reduces the flow of fluid past the cup valve or, from another viewpoint, increases the restriction formed by the cup valve and thereby raises the pressure within the channel 39 and the hydraulic motor 48. Increase in pressure on the bellows 49 of the hydraulic motor effects collapsing of the bellows against the force of the loading spring 56. This in turn causes upward movement of the link 55 until the increased compression in the spring 59 forces the lever 33 in a clockwise direction sufficiently to open the valve 38 and re-establish the normal balance of the mechanism. The travel of the link 55 simultaneously causes the turbine inlet valve 11 to move in the closing direction thus bringing the pressure in the turbine exhaust casing back to its proper value.

The regulation of the mechanism so far described which may be termed "main governing mechanism" is corrected or compensated by the provision of means including an auxiliary hydraulic motor 70 connected to the right-hand end portion of the governor lever 33. The hydraulic motor 70 is similar to the main hydraulic motor 48 and comprises a bellows 71 disposed within a chamber or cylinder 72, which latter communicates through a channel 73 including a needle valve 74 with the aforementioned channel 47. The upper end of the bellows 71 is rigidly secured to a flanged cylinder 75 provided with a cover 76 and secured to a seat formed by the casing 21. The bellows contains a loading spring 77 biasing the bellows downward towards a seat 78 formed by the casing and during operation preventing the bellows from collapsing by the pressure of operating fluid contained in the chamber 72. The lower end plate of the bellows contains a conical pivot bearing 79 engaged by the conically shaped end of a rod 80. The upper portion of the rod 80 is screw-threaded and connected by a spring clamp 81 to an intermediate turn of a correcting or compensating spring 82 concentrically surrounding the rod 80 and bearing at its upper end against the lower side of a recessed opening 83 in the right-hand portion of the lever 33. The upper side of the recessed opening 83 in the lever 33 is engaged by the lower end of a loading spring 84. The upper end of the spring 84 bears against a spring plate 85 held on a screw-threaded rod 86 and guided and prevented from rotation by guide posts 87 and 88 secured to the cover 22. The upper end of the rod 86 is provided with a handwheel 89 and held against vertical movement by a flanged support 90 which in turn is secured to the cover 22. Rotation of the handwheel 89 causes vertical movement of the spring plate 85 and thereby changes the compression of the loading spring 84. The characteristic of the correcting or compensating spring 82 may be changed by moving the spring clamp 81 up or down to strengthen or to weaken the spring 82.

The operation of the mechanism is as follows: With the needle valve 74 in closed position to shut off communication between the channel 47 and the hydraulic motor chamber 72 the operation is that of an ordinary governing mechanism as described above, that is the pressure in the exhaust casing will slightly increase as the flow decreases. With the needle valve 74 in opening position an increase in exhaust pressure causes downward movement of the left-hand end of the lever 33 which moves the cup valve 38 towards closing position to increase the pressure in the channel 47. This in turn effects upward movement of the rod 55, resulting in closing movement of the turbine inlet valve. The pressure in the exhaust casing then will be above its normal value by the amount of regulation of the governor. Now with the needle valve 74 slightly open, the increase in pressure in the channel 47 also causes a gradual increase in pressure in the chamber 72, forcing the bellows 71 upward against the biasing force of the loading spring 77 thus increasing the force which spring 82 exerts on the lever 33. This increase in force tends to compensate for the normal regulation of the governor. The number of effective turns in the spring 82 determines the amount of compensation that is accomplished. The needle valve 74 limits the rate at which this compensation takes place, thus insuring stable operation. The closing movement of the turbine inlet valve causes a drop in exhaust pressure and consequently a decreasing force onto the lever 33 by the rod 31 of the pressure responsive device until the decreasing force balances the force exerted onto the ends of the lever 33 by the hydraulic motors. As such balance is attained, the mechanism is in equilibrium and no further movement will take place until the exhaust pressure changes again. Thus, briefly, if the exhaust pressure increases, the main governing mechanism causes closing movement of the cup valve 38, resulting in closing movement of the turbine inlet valve and the correcting or compensating or auxiliary mechanism causes an additional closing of the cup valve 38, resulting in an additional closing movement of the turbine inlet valve to bring the pressure in the exhaust casing back to the desired value. The two movements naturally take place simultaneously, the main mechanism including the hydraulic motor 49 acting quickly, while the auxiliary or correcting mechanism acts slowly, the slow action or time delay of the latter depending upon the position of the needle valve 74, which latter determines the rate of increase in pressure in the chamber 72 of the auxiliary hydraulic motor in response to pressure increase in the channel 47. The amount of correction which determines the regulation of the entire governing mechanism may be varied by positioning of the spring clamp 81 for the correcting spring 82. The spring 82 may be set so that the pressure in the exhaust will remain constant during load variation of the turbine from no load to full load, in which case the mechanism constitutes an isochronous governing mechanism. Also, the spring 82 may be set so that the exhaust pressure changes in a predetermined manner in response to load changes on the turbine between no load and full load. Thus, for example, if the regulation of the main governing mechanism including the motor 49, 55, the device 24, 30 and the control valve 38, 29 is 4%, meaning that during change of load from no load to full load the pressure in the exhaust will decrease by 4% with the auxiliary or correcting mechanism out of operation, that is, with the needle valve 74 in closed position, this regulation of 4% may be varied or corrected by opening the needle valve 74 so that the pressure variation between no load and full load will decrease to any desired value or become zero. The pressure which the pressure governor holds at the exhaust casing of the turbine is adjusted by changing the compression of the spring 84.

With my invention I have accomplished an improved construction and arrangement of governing mechanisms whereby the regulation of such mechanisms may be readily varied. The particular mechanism described above is free from any pin connections. Instead, the various elements are connected by links with conical pivots engaging corresponding bearings. This reduces considerably the friction of the apparatus and increases accordingly its accuracy and sensitivity. The entire mechanism includes only a single lever 33 and is free from movable or adjustable fulcrums heretofore provided in mechanisms of this kind. Changes in either instantaneous or final regulation of the mechanism are made by changing the number of turns in the regulating spring 59 and the correcting spring 82. By turning the spring clamps 63 and 81, the regulation may be changed by infinitely small steps. In other words, the apparatus permits a gradual change of the regulation as distinguished from a stepped change. Only extremely small travel of the pressure responsive element 24 is needed for accurate control of the turbine inlet valve. The entire movement of the pressure responsive device 24 may be 10 mils and less. The extremely small travel prolongs the life of the pressure responsive element.

The regulation is changed by changing the characteristic in the system rather than changing the effective stroke of the operating element whereby substantially the same degree of accuracy is maintained for any degree of regulation. The correcting mechanism may be adjusted to under-correct or overcorrect that is to under compensate or overcompensate respectively the instantaneous regulation.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Governing mechanism comprising a controlling element, a controlled element, regulating means including a hydraulic motor for moving the controlled element in response to movement of the controlling element, and adjustable means directly responsive to the controlling element for compensating the regulation of the regulating means and including another hydraulic motor and a channel with an adjustable needle valve directly hydraulically connecting said other hydraulic motor to the first mentioned motor.

2. Governing mechanism comprising a hydraulic motor, a source of fluid under pressure connected to the motor, means for effecting movement of the motor in response to changes of a condition to be controlled, and auxiliary means responsive to the first named means for effecting additional movement of said motor including another hydraulic motor and a channel with a valve directly hydraulically connecting the other motor to the first motor.

3. Governing mechanism comprising a fulcrumed lever, a device responsive to a condition to be controlled and connected to the lever, a first hydraulic motor having a stem, a source of fluid under pressure connected to the motor, means for varying the fluid pressure in response to movement of the lever, an adjustable spring connecting the stem to the lever, and auxiliary means responsive to the change in fluid pressure for effecting additional movement of the motor.

4. Governing mechanism comprising a fulcrumed lever, a device responsive to a condition to be controlled and connected to the lever, a hydraulic motor having a stem connected to the lever, means including a cup valve connected to the lever for controlling movement of the motor in response to movement of the device, and auxiliary means including a second motor hydraulically connected to the first motor and to the lever and responsive to the change in fluid pressure in the first motor for effecting additional movement of the first motor.

5. Governing mechanism comprising a fulcrumed lever, a pressure responsive device connected to the lever, a hydraulic motor with a stem, means including a spring adjustably connecting the stem to the lever, a source of fluid under pressure connected to the motor, means including a variable orifice connected to the lever to effect movement of the motor in response to movement of the pressure responsive device, and auxiliary means responsive to the change in fluid pressure for effecting additional movement of the motor.

6. Governing mechanism comprising a fulcrumed lever, a pressure responsive device connected to the lever, a hydraulic motor with a stem, means including a spring adjustably connecting the stem to the lever, a source of fluid under pressure connected to the motor, means including a variable orifice connected to the lever to effect movement of the motor in response to movement of the pressure responsive device, and auxiliary means responsive to the change in fluid pressure for effecting additional movement of the motor, said auxiliary means comprising another motor hydraulically connected to the first motor and adjustable spring means connecting the other motor to the lever.

7. Governing mechanism with adjustable regulation including the combination of a controlled element, a controlling element, and means for moving the controlled element in response to movement of the controlling element, said means comprising a fulcrumed lever pivotally connected to the controlling element, a first and a second hydraulic motor, a source of fluid under pressure connected to the first motor, means including a control valve connected to the lever for controlling the fluid pressure in the first motor, a conduit with a valve directly connecting the second motor to the first motor whereby the fluid pressure in the second motor varies in response to movement of the control valve, and adjustable spring means connecting the motors to the lever.

8. Governing mechanism comprising the combination of a lever, a device connected to the lever and responsive to changes of a condition to be controlled, two hydraulic motors connected to the lever, a source of fluid under pressure, a control element connected to the lever and controlling the flow of fluid from the source to both motors, and means for controlling the rate of flow of fluid under pressure to one of the motors with relation to the rate of flow to the other motor.

9. Governing mechanism comprising a fulcrumed lever, a device connected to the lever and responsive to changes of a condition to be controlled, a first hydraulic motor having a piston with a stem for connection to an element to be controlled and yieldable means for connecting the stem to the lever, a second hydraulic motor having a piston with a stem and a means yieldably connecting the stem to the lever, means including a channel connected to both motors for conducting operating fluid thereto, and a control member connected to the lever for controlling the fluid pressure in the channel.

FRANCIS H. VAN NEST.